Dec. 3, 1968  G. W. CARTER  3,414,811
METHOD AND APPARATUS FOR TESTING THE RESISTANCE CHARACTERISTICS
OF SELF-HEATED ELECTRICAL RESISTORS
Filed Aug. 24, 1964
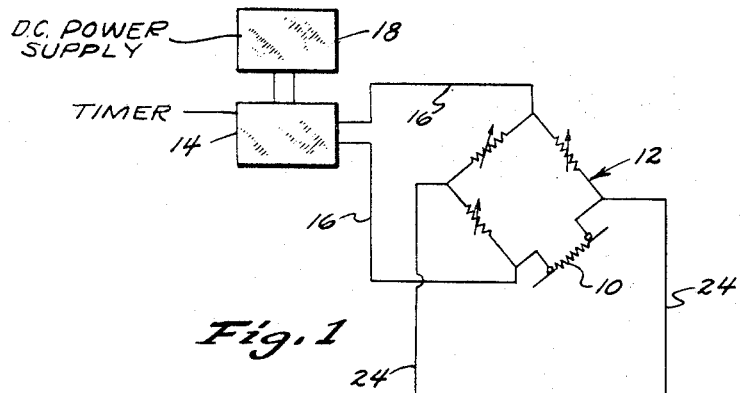
Fig. 1
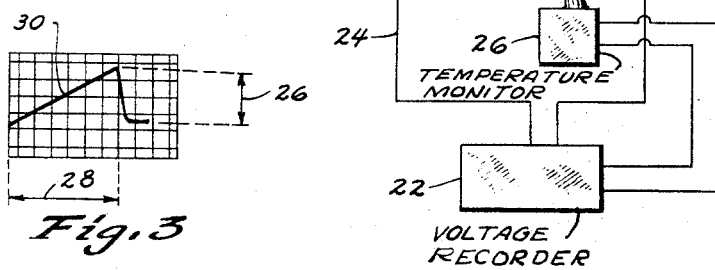
Fig. 2
Fig. 3
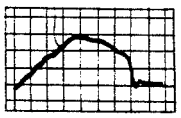
Fig. 4
INVENTOR.
GLENN W. CARTER
BY
ATTORNEYS

United States Patent Office 3,414,811
Patented Dec. 3, 1968

3,414,811
METHOD AND APPARATUS FOR TESTING THE RESISTANCE CHARACTERISTICS OF SELF-HEATED ELECTRICAL RESISTORS
Glenn W. Carter, Columbus, Nebr., assignor to Dale Electronics, Inc., Columbus, Nebr.
Filed Aug. 24, 1964, Ser. No. 391,379
12 Claims. (Cl. 324—62)

ABSTRACT OF THE DISCLOSURE

The method and means of testing the resistance characteristics of electrical devices by imposing a high voltage through an electrical device having a lower known power rating, and then measuring the change in resistance and temperature of the electrical device during the period of high voltage. The testing appartus is a Wheatstone bridge which is connected through a timer to a source of D.C. power. An oscilloscope or two axis pen recorder are electrically connected to the Wheatstone bridge to measure the time of voltage input and change of resistance, and an infrared temperature measuring unit positioned in the proximity of the electrical device being tested is optionally connected to the recording device to reflect changes in temperature of the resistance in the electrical device during the input of high voltage.

---

The determination of the operating characteristics and the quality of resistance elements is an essential part of the resistance manufacturing process. Resistance elements have in the past been checked for these characteristics by using extensive tests which often take hours or days to perform. Resistance element quality has in the past been generally checked by an operating life test for several days.

Therefore, a principal object of this invention is to provide a method and means for testing resistance elements whereby the resistance value of the element being tested is monitored during the time that high voltage is applied so that many more characteristics of the resistance element can be determined.

A further object of this invention is to provide a fast and economical method of measuring the temperature coefficient of the resistance elements.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a schematic drawing showing the equipment used in testing a resistance element;

FIG. 2 is a schematic similar to that of FIG. 1 but shows an alternate means for testing the resistance elements;

FIG. 3 is a view of the screen on a cathode ray oscilloscope (or the coordinate paper of a two axis pen recorder) showing a typical curve of the resistance change of a satisfactory resistance element during the test period; and FIG. 4 is a view similar to that of FIG. 3, but shows a resistance change curve of a defective resistor element.

The numeral 10 generally designates the resistor element being tested as it is positioned on the terminals of a Wheatstone bridge 12. Bridge 12 is of conventional construction but it is specially built to withstand great power without any detrimental effects. The power dissipating capabilities of the bridge 12 are substantially greater than the resistor being tested.

As is apparent hereafter, the device and method of this invention do not destroy the resistor being tested, but merely impose a wattage on a given resistance that is greater than its rated wattage. The term "rated wattage" in the trade means the maximum wattage than can be continuously applied to the resistor without creating significant changes in the resistivity thereof. As well known in the trade, the maximum safe overload wattage that can be applied to any resistance element is that wattage which can be applied for a given period of time which will provide the greatest electrical, mechanical and thermal stresses on the resistance element without incurring permanent damage thereto. This means that a high wattage applied for a short time, or a lower wattage (but greater than the rated wattage of the resistance element) applied for a longer time, could be used to overload the resistance element. Obviously, the magnitude of the overload wattage must be greater than the rated wattage of the resistance element, because by definition, the resistor can withstand its rated wattage or a lower wattage indefinitely with respect to time.

The normal use of a Wheatstone bridge is to balance the bridge with respect to the test resistance to determine the true value of the test resistance. Accordingly, the wattage applied to the Wheatstone bridge and the test resistance in such instances is only a small percentage of the rated wattage of the test resistance, and this is to prevent the test resistance and the Wheatstone bridge from becoming abnormally heated. By contrast, the power dissipating capabilities of the bridge 12 are substantially greater than that of the resistor being tested to permit a much greater wattage to be applied to the bridge and to the test resistor than the rated wattage of the resistor. Failure to maintain this balance of rated wattages between the bridge and the resistor can result in destruction of the bridge.

An adjustable timing device 14 of conventional construction is connected by leads 16 to opposite sides of the bridge 12 to permit the time interval of power input to the bridge to be limited. A source of direct current power supply 18 is connected to bridge 12 through the timing device 14 and leads 16.

Voltage recording means 20 or 22 is secured to the bridge 12 by leads 24 at opposite sides of the test resistor 10. Recording means 20 is comprised of a cathode ray oscilloscope 20A or equal with a camera 20B to record and preserve the readings presented on the oscilloscope screen. In FIG. 2, the recording means 22 is comprised of a two-axis pen recorder. As will be discussed hereafter, one axis of the oscilloscope 20A or pen recorder 22 can be used to reflect change in resistance while the other axis can be used to measure intervals of time or change in temperature.

An infrared temperature measuring unit 26 of conventional construction is beamed at the test resistor 10 in FIG. 2, and the unit 26 is then tied into one of the axes of the pen recorder 22. Equipment of the type indicated in unit 26 is commercially available from the Radiation Electronics Laboratory, Infrared Industries, Inc., Santa Barbara, Calif.

The arrangement of components in FIG. 1 will permit the analysis of the resistance valves of resistor 10 during the overload period and will permit the rapid calculation of the temperature coefficient of resistance. During a typical test, sufficient power will be applied to the bridge circuit to cause ten times (or up to fifty) rated power to be applied to resistor 10. The timer 14 will limit the power application to 5 seconds, for example. This time period can be varied from a fraction of a second to several seconds. During the overload conditions, the unbalanced voltage of the bridge circuit is monitored by either an oscilloscope 20A or by a pen recorder. With reference to FIG. 3, the x or horizontal axis will meaure the time interval, and the vertical y axis will record the change in resistance. Thus, the dimension line 26 in FIG. 3 denotes the change in resistance during a time interval of five seconds indicated by the dimension line 28. If the curve of the resistance change in FIG. 3 appears as a straight line, as indicated by the numeral 30, the resistance characteristics of the element 10 are regarded to be satisfactory. If the curve is irregular as shown by the curve 32 in FIG. 4, it can be immediately ascertained that the resistor is defective. The curve 32 might be indicated by a poor resistance wire weld, but similar irregular curves will result by having excessive wire on the resistance cap; metal chips in the windings; unstable wire; shorted turns; or overstressed wire.

Temperature coefficient is a measurement of the resistance change of a resistor which is dependant upon temperature change. This characteristic is usually measured by making a resistance measurement of a resistor at one specific temperature, and then transferring the resistor to an oven which is at a different temperature, and measuring the difference in the resistance value. This process may take as long as an hour to complete.

By the method of the invention, the slope of the "line" or curve 30 (FIG. 3) denotes the temperature coefficient, and if the slope of the line exceeds a certain predetermined value, then it is determined that the temperature coefficient for that resistor is unsatisfactory. Any values that fall below this predetermined slope would indicate that the temperature coefficient of that resistor was within desirable limits.

The precise temperature coefficient of a given resistor can be calculated, if, through previous measurements, certain data is determined. If it has been previously determined that the resistor had an average temperature rise of 150° C. during a 6 second "voltage-on" period, and if the resistance change of that particular resistor during the above test is measured as 0.3% of the total resistance, the temperature coefficient of resistance is then $$0.3\%/150° C.=0.002\% \text{ per degree C.}$$

When the infrared temperature monitoring unit 26 is used as indicated in FIG. 2, it is connected to the "x" axis of the recording means being employed, so that the dimension line 28 in FIG. 3 will indicate change in temperature. The resulting curve 30 will thereupon directly reflect the change of resistance relative to the temperature change.

Thus, it is seen that the above described equipment and the method by which it is used will provide an exceedingly rapid and extremely accurate and economical analysis and evaluation of resistance elements which will be suitable for production line use.

Some changes may be made in the construction and arrangement of my method and means for testing resistance elements without departing from the real spirit and purpose of my invention, and it is my intention to cover by my claims, any modified forms of structure or use of mechanical equivalents which may be reasonably included within their scope.

I claim:

1. The method of testing the resistance characteristics of resistance elements to determine defects therein, comprising, taking a resistance element, determining the rated wattage of said resistance element by determining the maximum magnitude of wattage that can be continuously applied to said resistance element without creating significant changes in the resistivity thereof, determining the amount of maximum overload wattage that can be applied to said resistance element during a first period of time which will provide the greatest electrical, mechanical and thermal stresses on said resistance element without incurring permanent damage thereof, applying a test overload wattage to said resistance element in a magnitude greater than said rated wattage but less than the equivalent of said maximum overload wattage applied for said first period of time, and measuring the change in resistance of said resistance element with respect to the passage of time during the period that said test overload wattage is applied, and then comparing the measured change in resistance with the resistance of a known non-defective resistance similarly overloaded to detect any defects in said resistance element as reflected by any variations in the resistance change therebetween.

2. The method of claim 1 wherein said resistance element is positioned in electrical contact across the terminals of a Wheatstone bridge capable of dissipating the equivalent of said maximum overload wattage applied during said first period of time, and applying said test overload wattage to said Wheatstone bridge and taking said measurement in the change of said resistance element while said resistance element is positioned across the terminals of said Wheatstone bridge.

3. The method of claim 1 wherein the change in temperature of said resistance element is also measured during the period that said test overload wattage is applied to said resistance element.

4. The method of claim 1 wherein the change is resistance of said resistance element is reflected on a two-axis recording device whereupon said recording device will define a curve comprised of coordinates from one axis as change in resistance of said resistance element, and coordinates from said other axis in units of time.

5. The method of claim 1 wherein the measured change in resistance of said resistance element is compared with the change in resistance of a known resistance similarly overloaded to determine the temperature coefficient of said resistance element as reflected by any variations in the resistance change therebetween.

6. The method of testing the resistance characteristics of resistance elements, comprising, taking a resistance element having a predetermined power rating, imposing a high wattage through said resistance element greater than the predetermined power rating of said resistance element for a predetermined period of time, measuring the change in resistance value and the change in temperature in said resistance element during the period that said high wattage is imposed therethrough, and reflecting the change in resistance on a two-axis recording device whereupon said recording device will define a curve comprised of coordinates from one axis as change in resistance of said resistance element, and coordinates from said other axis as change in temperature of said resistance element.

7. A device for testing the resistance characteristics of resistance elements, comprising, in combination, a Wheatstone bridge with terminals, a test resistor with a predetermined power rating between said terminals, a power circuit connected to the input terminals of said bridge, a timing device in said power circuit for selectively closing said circuit for a predetermined interval, the power rating of said Wheatstone bridge being substantially greater than the power rating of said test resistor, and first and second measuring means operatively connected to the output terminals of said Wheatstone bridge to measure the change in resistance and temperature, respectively, of said test resistor when a high wattage in excess of the predetermined power rating of said test resistor is passed through said bridge; comprising, a two axis indicating device whereupon said indicating device will define a curve comprised of coordinates from one axis as change in resistance of said test resistor, and coordinates from said other axis as change in temperature of said test resistor.

8. The combination of claim 7 wherein said indicating device is an oscilloscope.

9. The combination of claim 7 wherein said indicating device is an oscilloscope and a recording camera to photograph the screen of said oscilloscope.

10. The combination of claim 7 wherein said indicating device is a two axis pen recording device.

11. The combination of claim 7 wherein an infrared temperature measuring device is operatively connected to said measuring means and is beamed at said test resistor to measure the change in temperature of said test resistor when said high voltage is applied to said bridge; said infrared temperature measuring device being operatively connected to said other axis of said two axis recording device.

12. A device for testing the resistance characteristics of resistance elements, comprising, in combination, a Wheatstone bridge with terminals, a test resistor with a predetermined power rating between said terminals, a power circuit connected to the input terminals of said bridge, a timing device in said power circuit for selectively closing said circuit for a predetermined interval, the power rating of said Wheatstone bridge being substantially greater than the power rating of said test resistor, and first and second measuring means operatively connected to the output terminals of said Wheatstone bridge to measure the change in resistance and temperature, respectively, of said test resistor when a high wattage in excess of the predetermined power rating of said test resistor is passed through said bridge, said measuring means including an infrared temperature measuring device operatively connected to said measuring means and beamed at said test resistor to measure the change in temperature of said test resistor when said high voltage is applied to said bridge.

References Cited

UNITED STATES PATENTS

| 2,571,605 | 10/1951 | Peters | 73—362 XR |
| 2,935,874 | 5/1960 | Morgan | 324—34 |
| 2,980,853 | 4/1961 | Kline, et al. | 324—57 |
| 3,025,706 | 3/1962 | Oppenheim | 73—362 |
| 3,179,248 | 4/1965 | Manley | 324—62 XR |
| 3,245,261 | 4/1966 | Buteux, et al. | 73—355 |
| 3,257,606 | 6/1966 | Grant | 324—62 XR |
| 3,271,678 | 9/1966 | Daly, et al. | 324—121 |
| 2,553,986 | 5/1951 | Statham | 324—62 |
| 2,906,951 | 9/1959 | Van Blerkom | 324—62 XR |
| 3,207,980 | 9/1965 | Shockroo, et al. | 324—62 |
| 3,296,523 | 1/1967 | Haas | 324—65 XR |

FOREIGN PATENTS

| 116,949 | 3/1955 | U.S.S.R. |
| 155,966 | 9/1962 | U.S.S.R. |
| 229,640 | 2/1944 | Switzerland. |

OTHER REFERENCES

Hounanian, Instruments & Automation, "Measurement of Temperature Coefficient of Resistance", vol. 28, August 1955, pp. 1324–1326.

McDonald, Instruments & Automation, "Infrared Radiometer", vol. 33, September 1960, pp. 1527–1530.

RUDOLPH V. ROLINEC, *Primary Examiner.*

E. E. KUBASIEWICZ, *Assistant Examiner.*